UNITED STATES PATENT OFFICE.

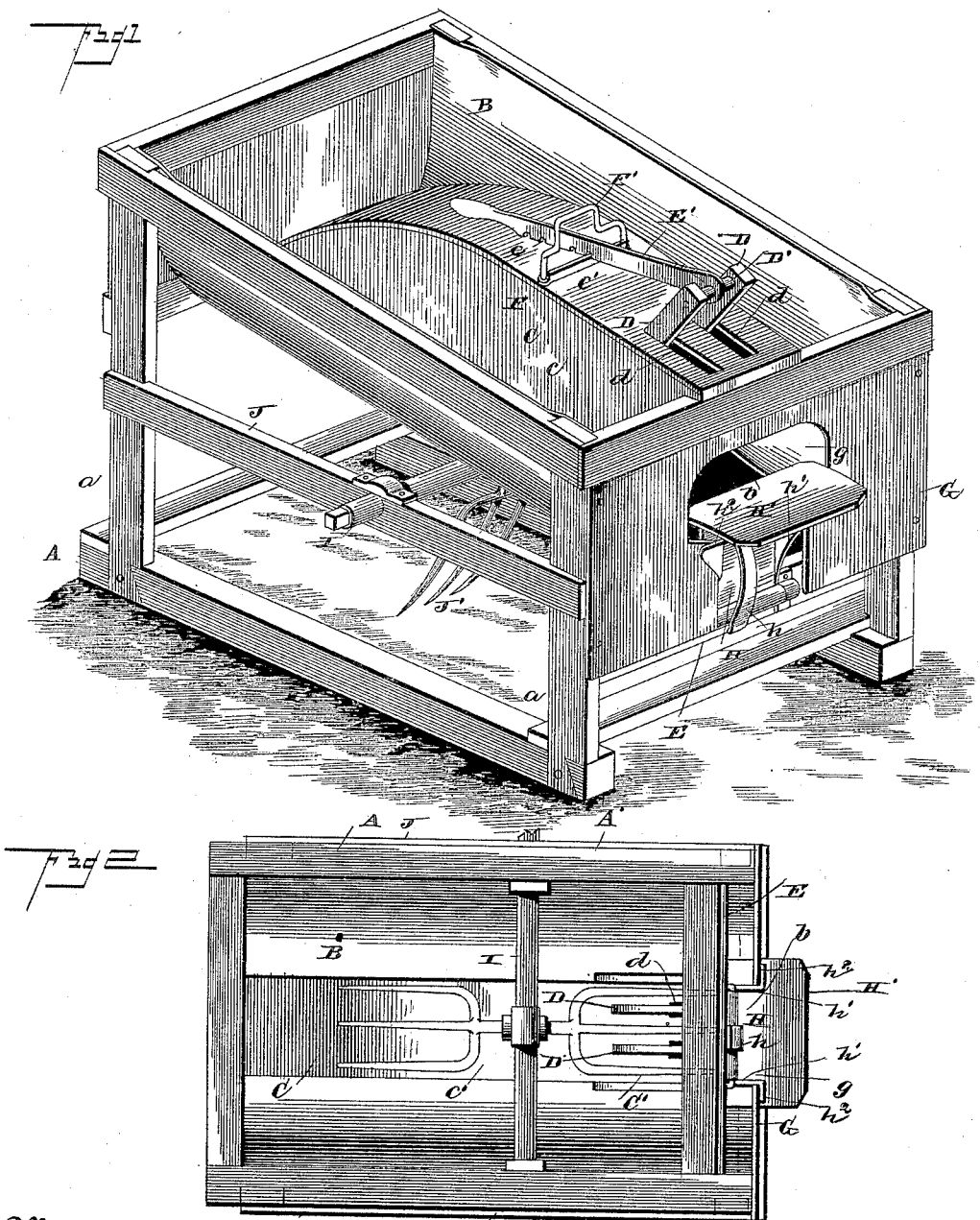

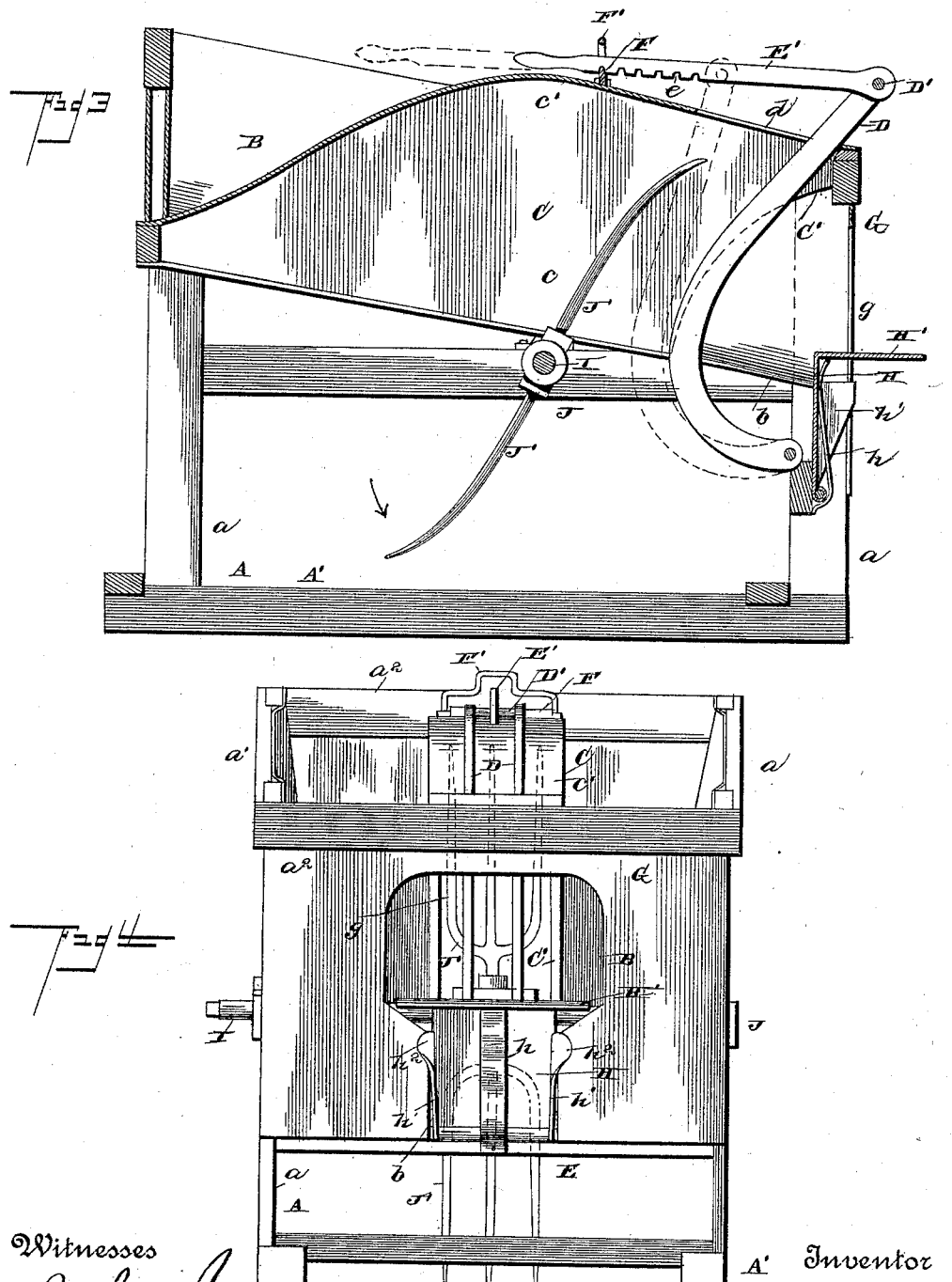

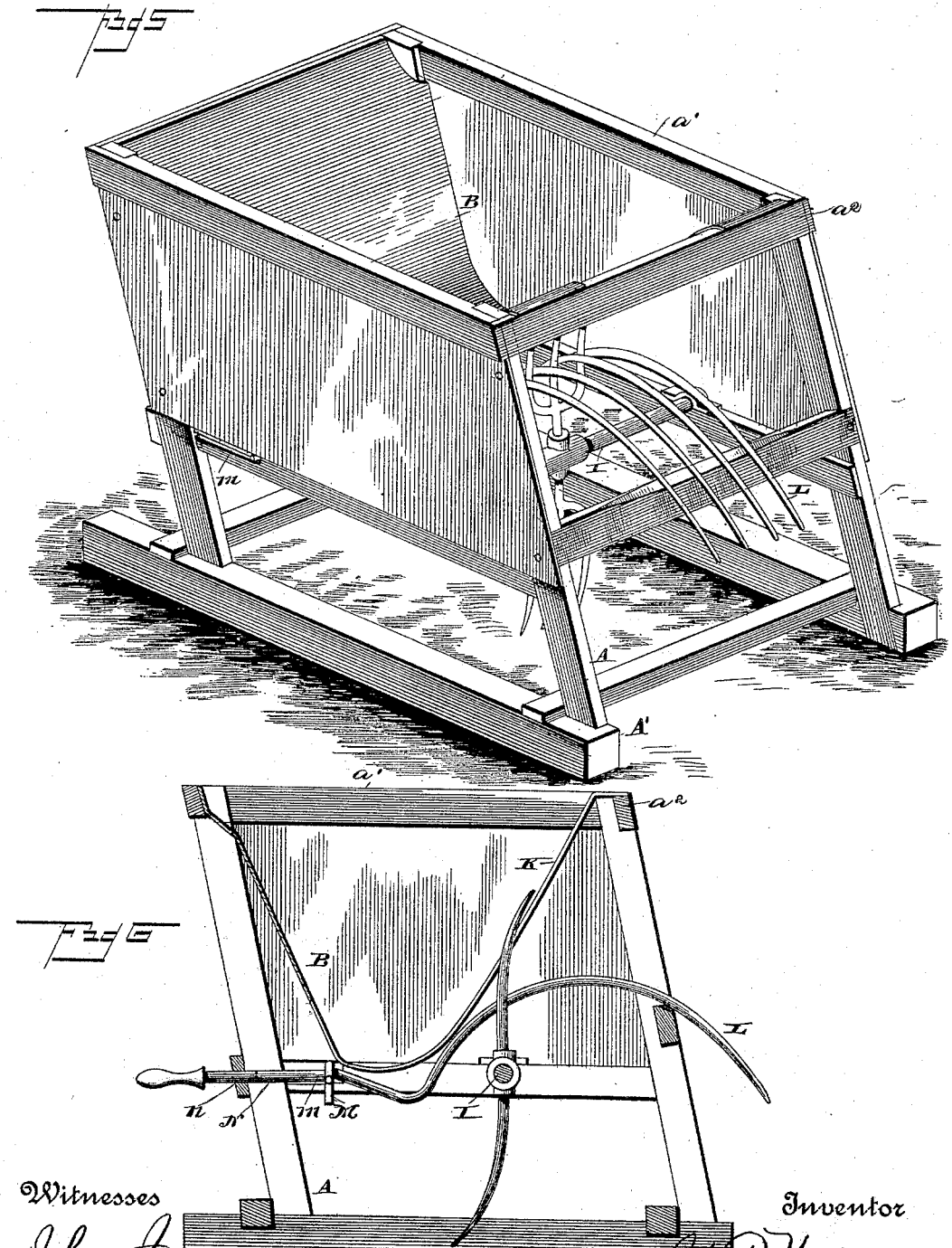

GEORGE P. WEBSTER, OF LIPSCOMB, TENNESSEE.

FEEDER FOR SEED-POTATO CUTTERS.

SPECIFICATION forming part of Letters Patent No. 440,522, dated November 11, 1890.

Application filed May 15, 1890. Serial No. 351,920. (No model.)

*To all whom it may concern:*

Be it known that I, GEORGE P. WEBSTER, a citizen of the United States, residing at Lipscomb, in the county of Maury and State of Tennessee, have invented certain new and useful Improvements in Feeders for Seed-Potato Cutters; and I do hereby declare that the following is a full, clear, and exact description of the invention, which will enable others skilled in the art to which it appertains to make and use the same.

This invention relates to a feeder for seed-potato cutters designed to feed the whole potatoes to the latter, by which they are cut into "seed" for the purpose of planting.

The object of the invention is to provide a device of this character which will be automatic in its operation, simple, durable, and inexpensive in construction, and possess advantages in point of general efficiency.

A further object of the invention is to provide in a device of this character simple and efficient means for regulating the feed thereof.

In the drawings, Figure 1 is a perspective view of my invention. Fig. 2 is a bottom or inverted plan view. Fig. 3 is a vertical longitudinal sectional view illustrating the operation of the feed-regulating device. Fig. 4 is a front end elevation. Fig. 5 is a perspective view of a modified form of feeder in which an overshot-feed system is employed. Fig. 6 is a vertical longitudinal sectional view thereof.

Corresponding parts in the figures are denoted by the same letters of reference.

Referring to the drawings, A designates a frame or support, constructed of wood or other material and preferably comprises a rectangular base A', from each of the corners of which projects an upright $a$, connected at their upper ends by side and end beams $a'$ $a'$ and $a^2$ $a^2$, respectively, the front uprights $a$ being preferably shorter than the rear uprights.

At the upper portion of the frame A is mounted a hopper B, constructed of sheet metal or other suitable material and tapering to the central portion of its front end, where it is provided with an opening $b$. Within the center of the hopper is disposed a longitudinal inverted casing C, opening through the bottom of the hopper and formed by sides $c$ $c$ and an arched top $c'$, the sides $c$ being provided with openings $C'$ contiguous to the opening at the front end of the hopper. The opening $b$ of the hopper is broken by two or more correspondingly-curved parallel bars D D, pivotally mounted at their lower ends upon a cross-beam E, from whence said bars are curved rearwardly, thence upwardly through the opening and forwardly, the upper ends of the bars passing through elongated slots $d$ $d$ in the top of the casing C and united by a bolt or bar D'. The bars D being at their lower curved portions below the bottom of the hopper, they form a pocket into which the potatoes fall previous to being fed from the hopper. To obviate the liability of the pocket becoming choked by potatoes of varying sizes, the bars D are designed to be adjustable forwardly or rearwardly. To effect this adjustment I provide an arm E', bearing at its front end upon the connecting-bolt D' and extending rearwardly over a locking bar or plate F and under an arch F', mounted upon the top of the casing C. The arm E' is provided at its rear end upon its under edge with teeth $e$, adapted to be engaged by the locking bar or plate F. Thus when small potatoes are to be fed the arm E' is thrown forwardly, decreasing the size of the pocket and admitting but a single potato at a time, while in the case of large potatoes the arm E' is adjusted rearwardly to enlarge the pocket sufficiently to permit the reception of the potatoes in the manner just described. The front of the hopper is preferably formed by a metallic plate G, secured to the front uprights $a$ and provided with a central opening $g$, coinciding with the opening $b$ in the bottom of the hopper. This opening $g$ is partially closed by a door H, hinged horizontally to the beam E, from which it projects upwardly, and is held in normal position by the inward tension of a spring $h$, secured to the beam E, and has its free end bearing against the outside of said door. The latter is provided with outturned side flanges $h'$ $h'$, which project beyond the edges of the opening $g$, and have their projecting upper ends bent so as to project beyond the edges of said opening and form stops $h^2$ $h^2$, limiting the inward movement of the door. A broadened and elongated flange H' is also provided at the top edge of the door, which is adapted to project over the hopper of the potato-cutter.

I designates a transverse rotatable shaft disposed under the hopper and journaled about midway the length of the feeder upon horizontal beams J J, secured to the uprights $a$. The shaft I is preferably geared in any suitable manner with the cutter, or it may be adapted to be operated by hand-power. Upon the shaft I are rigidly secured two or more reversely-curved forks J′, which are adapted during the rotation of the shaft, as indicated by the arrow, Fig. 3, to play within the casing C, the prongs of said forks passing up between and at each side of the bars D. The prongs of the forks are so curved that when they pass between the bars D the convex sides thereof are uppermost, the object of which will hereinafter appear.

The operation and advantages of my invention will be readily understood by those skilled in the art to which it appertains. The potatoes when placed in the hopper seek the lowest point thereof and drop one at a time into the pocket formed by the bars D. As one of the forks comes in contact with the potato contained within the pocket, the same is held in contact with said fork by the pressure of the spring-door until the potato has been carried above the latter, when it is thrown out by the fork and into the potato-cutter hopper. When the potato has been removed from the pocket, another one seeks its place, which is caught up by the following fork and discharged from the feeder in the manner just described.

In Figs. 5 and 6 I have illustrated a modified form of feeder, in which an overshot-feed system is employed. In this construction the hopper is inclined to a point near its rear end and is provided with a central longitudinal opening K, extending from the front thereof to its lowest point. Within this opening is disposed a series of parallel longitudinal bars L, secured at their rear ends to a longitudinally-adjustable bar M, disposed transversely under the hopper and has its ends sliding in slots or grooves $m\ m$, provided in side beams of the frame. From their secured ends the bars L are inclined downwardly for a short distance, and from thence are curved upwardly and forwardly, the front ends being curved downwardly and adapted to project over the hopper of the cutter. For adjusting the bars L with relation to the size of the potatoes and also for guiding said bars three short bars N are provided, which project rearwardly from the bar M and through perforations $n$ in the rear beam of the frame. The central bar N is of greater length than the side ones and forms an extended handle, by which the adjusting mechanism is controlled. The shaft I in this form of feeder is journaled in advance of the angle formed by the front and rear portions of the bars L and and is disposed under the latter. As the shaft rotates, the prongs of the forks secured thereto pass up between the rear portions of the bars L, and thence between the front portions of said bars, carrying with them the potatoes contained within the pocket formed at the angle of the bars L, said pocket being, as in the case of the construction previously described, of such dimensions as to prevent the entrance of more than a single potato at a time. In the present construction the spring-held door is dispensed with and the potatoes are carried by the forks over the upward curve of the bars L, from whence they fall into the hopper of the cutter.

I claim as my invention—

1. In a device of the character described, the combination, with a hopper provided at its lowest point with an opening, of bars covering said opening and forming a pocket located at a plane below the bottom of the hopper, means for adjusting said bars to regulate the size of said pocket, and a rotatable shaft provided with forks, the prongs of which are adapted to pass between said bars and through the pocket and eject the potatoes contained therein, substantially as set forth.

2. In a device of the character described, the combination, with a hopper tapering to a common point and there provided with an opening, of bars inclosing said opening and forming a pocket at a plane below the hopper, a rotatable shaft carrying radially-disposed forks, the prongs of which are adapted to pass between said bars and through the pocket, and an inverted casing disposed in the hopper and over said forks during their passage through the body of the hopper, substantially as set forth.

3. In a device of the character described, the combination, with a hopper tapering to a common point and there provided with an opening and an inverted casing disposed centrally within the hopper and provided with openings contiguous to said hopper-opening, of bars inclosing said latter opening and forming a pocket and a rotatable shaft carrying forks working in said casing and adapted to pass between said bars, substantially as and for the purpose set forth.

4. In a device of the character described, the combination, with a hopper tapering to its front end and there provided with a bottom opening, an opening in the front of the hopper, and a spring-held outwardly-yielding door partially closing the same for the purpose described, of bars inclosing said bottom opening and forming a pocket and a rotatable shaft carrying forks adapted to pass between said bars, substantially as and for the purpose set forth.

5. In a device of the character described, the combination, with a hopper tapering to a common point and there provided with an opening and a rotatable shaft carrying forks for the purpose described, of bars inclosing the opening in the hopper and forming a pocket and means for adjusting said bars to regulate the size of said pocket, substantially as and for the purpose set forth.

6. In a device of the character described, the combination, with a hopper provided at its lowest point with an opening, of bars inclosing said opening and forming a pocket and an adjusting-bar connected with the upper ends of said bars and provided with a notched under edge, adapted to engage a retain bar or plate, substantially as and for the purpose set forth.

7. In a device of the character described, the combination, with a hopper provided with an opening at its lowest point and with an opening in the adjacent vertical wall, of bars inclosing said bottom opening, hinged at their lower ends below the hopper and curved therefrom to above the same, and an outwardly-yielding spring-held door partially closing said wall-opening, substantially as and for the purpose set forth.

8. In a device of the character described, the combination, with a hopper tapering toward its front end and there provided with a bottom opening and a front opening in the hopper, of an outwardly-yielding spring-held door partially closing said front opening, bars inclosing the bottom opening and forming a pocket, means for adjusting said bars, and rotatable forks adapted to pass between the latter, substantially as and for the purpose set forth.

In testimony whereof I affix my signature in presence of two witnesses.

GEORGE P. WEBSTER.

Witnesses:
JAMES HOWARD,
W. B. WILSON.